United States Patent
Ormsbee et al.

(10) Patent No.: US 10,512,247 B2
(45) Date of Patent: Dec. 24, 2019

(54) SYSTEMS AND METHODS FOR A LIGHT-UP OBJECT WITH ENHANCED FEATURES FOR ANIMALS

(71) Applicant: Nite Ize, Inc., Boulder, CO (US)

(72) Inventors: Bowden Ormsbee, Longmont, CO (US); Rex W. Stevens, Longmont, CO (US)

(73) Assignee: Nite Ize, Inc., Boulder, CO (US)

( * ) Notice: Subject to any disclaimer, the term of this patent is extended or adjusted under 35 U.S.C. 154(b) by 262 days.

(21) Appl. No.: 15/398,573

(22) Filed: Jan. 4, 2017

(65) Prior Publication Data

US 2017/0188546 A1 Jul. 6, 2017

Related U.S. Application Data

(60) Provisional application No. 62/275,104, filed on Jan. 5, 2016.

(51) Int. Cl.
| | |
|---|---|
| *A01K 15/02* | (2006.01) |
| *F21V 33/00* | (2006.01) |
| *A63B 43/06* | (2006.01) |
| *F21V 23/04* | (2006.01) |
| *H05B 37/02* | (2006.01) |

(Continued)

(52) U.S. Cl.
CPC ............ *A01K 15/025* (2013.01); *A63B 43/06* (2013.01); *F21V 23/0492* (2013.01); *F21V 33/008* (2013.01); *H05B 37/0281* (2013.01); *A63B 2208/14* (2013.01); *A63B 2209/00* (2013.01); *A63B 2220/40* (2013.01); *A63B 2220/833* (2013.01); *A63B 2225/605* (2013.01); *F21V 15/01* (2013.01); *F21Y 2115/10* (2016.08); *H05B 37/0227* (2013.01); *Y02B 20/42* (2013.01)

(58) Field of Classification Search
CPC .... A01K 15/025; A01K 15/026; A63B 43/06; A63B 67/197; A63B 41/08; F21V 33/008
See application file for complete search history.

(56) References Cited

U.S. PATENT DOCUMENTS

| | | |
|---|---|---|
| 4,919,422 A | 4/1990 | Ma |
| 5,403,000 A | 4/1995 | Woosley |

(Continued)

FOREIGN PATENT DOCUMENTS

CA  2919872 A1 * 9/2015 ........... A01K 15/025

OTHER PUBLICATIONS

International Search Report and Written Opinion dated Mar. 13, 2017 issued in related PCT App. No. PCT/US2017/012189 (16 pages).

*Primary Examiner* — Magdalena Topolski
(74) *Attorney, Agent, or Firm* — Haynes and Boone, LLP

(57) ABSTRACT

A light-up object includes a rubberized outer body; a plug in a cavity of the outer body; and a lighting device located in the plug. The light-up object further includes a first inner capsule piece, the first inner capsule piece located in the plug, and a second inner capsule piece located in the cavity of the outer body, the second inner capsule piece shaped to engage with the first inner capsule piece. The first and second inner capsules are threaded to fit together. The outer body includes grooves, running around multiple circumferences of the outer body. The outer body has a size of approximately a baseball; the outer body is shaped approximately like a sphere; and the grooves are at least 5 mm deep in the outer body.

20 Claims, 4 Drawing Sheets

(51) Int. Cl.
*F21Y 115/10* (2016.01)
*F21V 15/01* (2006.01)

(56) References Cited

U.S. PATENT DOCUMENTS

| | | | | |
|---|---|---|---|---|
| 6,059,676 A * | 5/2000 | Seymour | ............... | A63B 43/002 473/570 |
| 6,148,771 A * | 11/2000 | Costello | ................ | A01K 15/026 119/709 |
| 7,074,106 B1 * | 7/2006 | Deutsch | ............... | A01K 15/025 119/711 |
| 7,146,934 B1 * | 12/2006 | Staley | ................. | A01K 15/026 119/709 |
| 7,179,181 B2 | 2/2007 | Ko | | |
| 8,727,918 B1 * | 5/2014 | Gentile | ................. | A63B 43/06 473/570 |
| 8,727,919 B1 * | 5/2014 | Gentile | ................. | A63B 43/06 473/570 |
| 8,926,331 B1 | 1/2015 | Schlapik | | |
| 10,285,380 B1 * | 5/2019 | Mullin | ................ | A01K 15/025 |
| 2002/0115377 A1 * | 8/2002 | Herrenbruck | ........ | A01K 15/025 446/475 |
| 2012/0244969 A1 | 9/2012 | Binder | | |
| 2013/0019812 A1 * | 1/2013 | Rutherford | .......... | A01K 15/025 119/707 |
| 2013/0210563 A1 * | 8/2013 | Hollinger | ............. | H04N 5/2252 473/570 |
| 2014/0270931 A1 * | 9/2014 | Jager | ..................... | A01K 15/025 403/343 |
| 2014/0308875 A1 * | 10/2014 | Renforth | ................ | A63H 33/26 446/485 |
| 2015/0072810 A1 * | 3/2015 | Kortegast | .............. | A63B 43/06 473/570 |
| 2015/0159846 A1 | 6/2015 | Hollinger | | |
| 2015/0342145 A1 * | 12/2015 | Christianson | ........ | A01K 15/021 119/51.11 |
| 2016/0001137 A1 * | 1/2016 | Phillips | ................ | A63B 43/008 473/570 |
| 2016/0074714 A1 * | 3/2016 | Krysiak | ................. | A63B 41/08 473/570 |
| 2016/0223145 A1 * | 8/2016 | Dai | .......................... | F21L 4/02 |
| 2016/0243410 A1 * | 8/2016 | Larson | ................... | A63B 41/00 |
| 2016/0354646 A1 * | 12/2016 | Wang | ..................... | A63B 43/06 |
| 2018/0125034 A1 * | 5/2018 | Lai | ........................ | A01K 15/025 |

\* cited by examiner

SYSTEMS AND METHODS FOR A LIGHT-UP OBJECT WITH ENHANCED FEATURES FOR ANIMALS

CROSS REFERENCE TO RELATED APPLICATION

This application claims the benefit of U.S. Provisional Patent Application No. 62/275,104 filed Jan. 5, 2016, and hereby incorporated by reference to the same extent as though fully disclosed herein.

BACKGROUND

Lighted objects are popular devices for entertainment, recreation, and other activities. Common forms of devices are those that are rounded or ball shaped. It is desirable for these devices to be designed for usage with animals. It is also desirable that they withstand the abuses of usage well.

SUMMARY

In one embodiment, a light-up object includes a rubberized outer body; a plug in a cavity of the outer body; and a lighting device located in the plug. In one alternative, the light-up object further includes a first inner capsule piece, the first inner capsule piece located in the plug and a second inner capsule piece located in the cavity of the outer body, the second inner capsule piece shaped to engage with the first inner capsule piece. In another alternative, the first and second inner capsules are threaded to fit together. Optionally, the first inner capsule is fixed in the plug. Alternatively, the plug is overmolded on the first inner capsule. Optionally, the second inner capsule is fixed in the cavity. In one configuration, the outer body includes grooves, the grooves running around multiple circumferences of the outer body. In another configuration, the outer body has a size of approximately a baseball; the outer body is shaped approximately like a sphere; and the grooves are at least 5 mm deep in the outer body. Alternatively, the grooves are at least 1 cm deep, and the grooves are located around the circumference of the outer body. Optionally, the plug includes an indentation and the first inner capsule includes a notch, the notch aligned with the indentation, such that a screwdriver head may be placed through the indentation and into the notch to apply torque to the plug and first inner capsule. Alternatively, the plug and the outer body are composed of translucent Thermo Plasticized Rubber (TPR). Optionally, the first and second inner capsules are composed of polycarbonate. In one configuration, the lighting device includes an LED. In another configuration, the lighting device includes a control board connected to the LED, the control board including and executing code to cause the LED to be activated in a first operational mode for a first time period when a first impulse or greater is measured by the control board. Optionally, the control board includes a first accelerometer and a second accelerometer for measuring the first impulse. Alternatively, after the first period of time, the LED is activated in a second operational mode for a second period of time. Optionally, after the second period of time, the LED is deactivated. In another alternative, if at any time the first impulse or greater is measured by the control board, the first time period is reset and the LED is activated in a first operational mode.

DETAILED DESCRIPTION

Figure 1:
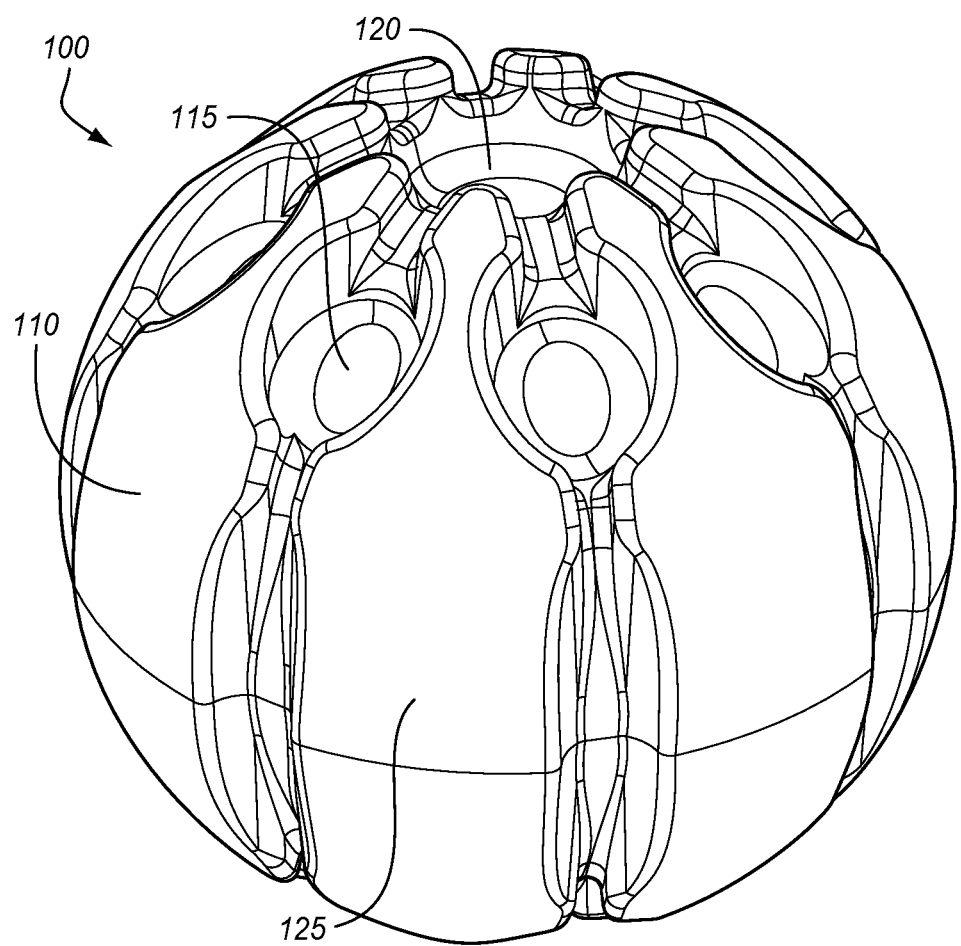
FIG. 1 shows one embodiment of a light-up object with enhanced features for animals.

Certain terminology is used herein for convenience only and is not to be taken as a limitation on the embodiments of a light-up object with enhanced features for animals. In the drawings, the same reference letters are employed for designating the same elements throughout the several figures.

FIG. 1 shows one embodiment of a light-up object with enhanced features for animals. In the embodiment shown, ball 100 includes a rounded outer shell made out of Thermo Plasticized Rubber (TPR) milky white 40+/−3 shore A. Although the object is shown in a spherical ball, other designs are possible, including those with elongated shapes (like footballs), angular shapes (rectangles, squares, or other prism or multi-sided objects), or objects resembling non-ball-like objects such as bones, small animals, etc. One concern users of such a ball 100 may have is that the object will become lodged in the animal's mouth or throat. In such a scenario, the ball 100 is designed to help accommodate an animal's breathing for a very brief time until the ball can be removed. This accommodation results from ridges 110 and depressions 115, 120.

Additionally, the design of ridges 110 and depressions 115, 120 as compared to the rest of the body 125 provides for areas of increased light penetration from the lighting module located inside of the ball 100. Ball 100 typically is made of a translucent material such as TPR; however, many other translucent materials may be used, especially those that are durable and have some elasticity, enabling the ball 100 to bounce. Additionally, by having ridges 110 and depressions 115, 120, the durability of ball 100 is not sacrificed, since the body 125 may retain thickness in other areas. Additionally, ridges 110 and depressions 115, 120 add to the grip of ball 100, making it easier for the animal to hold the ball in its mouth.

Figure 2:
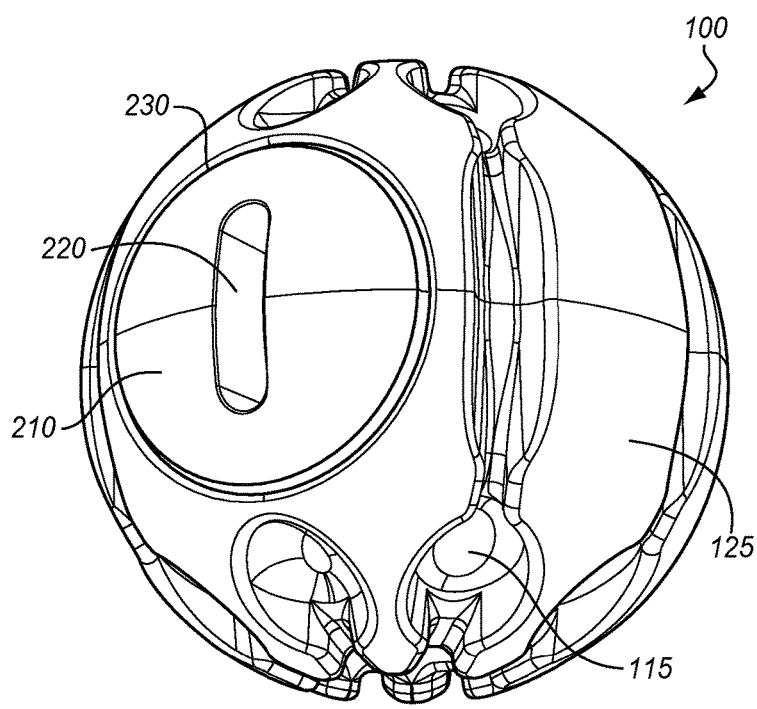
FIG. 2 shows another view of the light-up object of FIG. 1.

FIG. 2 shows a different view of ball 100. Visible in this view are cavity 230 and plug 210, which includes indentation 220. Plug 210 holds a lighting module which serves to light ball 100. Indentation 220 assists in providing a means for the removal of plug 210 from cavity 230. Plug 210 is fitted into cavity 230 and is held in place via a screw-tight system.

Figure 3:
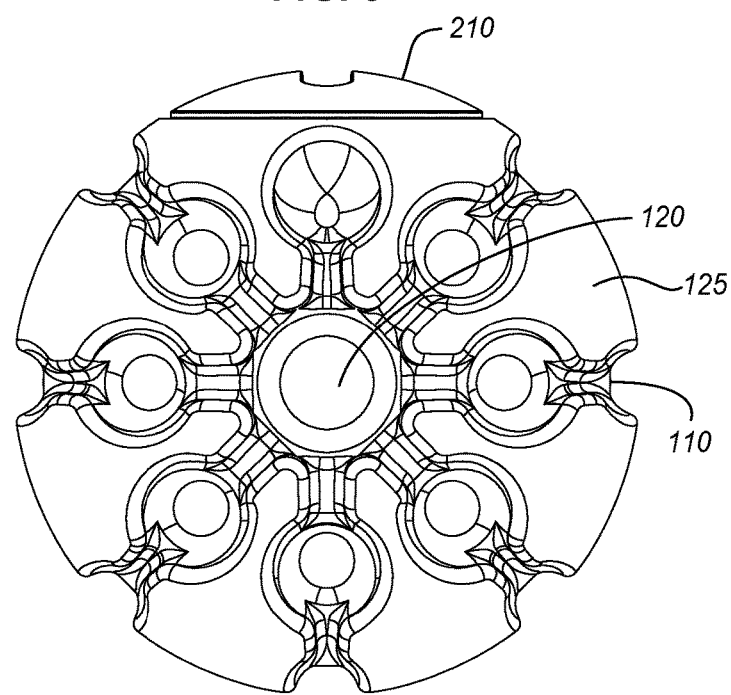
FIG. 3 shows another view of the light-up object of FIG. 1.

FIG. 3 shows another view of ball 100.

Figure 4:
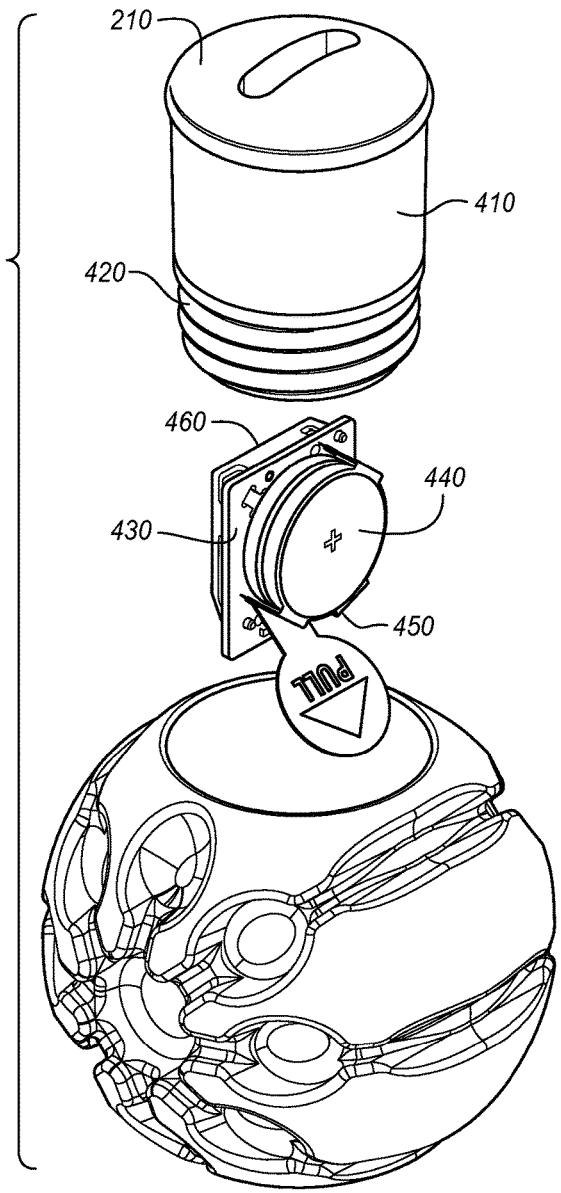
FIG. 4 shows an exploded view of the light-up object of FIG. 1.

FIG. 4 shows plug 210 pulled out of cavity 230. Plug 210 includes an overmolded TPR section 410 and a polycarbonate screw section 420. Cavity 230 includes a reciprocal screw section (not shown) for receiving screw section 420. In all cases, the material described for these parts is purely exemplary. In many embodiments, the screw sections are made of a more rigid material such as polycarbonate and the ball and plug are made of TPR.

Lighting module 430 is designed to fit into plug 210. Lighting module 430 includes a power source 440, such as batteries, a lighting source 450, and a control board 460. In many embodiments, lighting source 450 is an LED. In some embodiments, an LED is included on both sides of lighting module 430. As shown in the figure, ball 100 may come packaged with a removable tab that separates the batteries from completing a circuit.

Figure 5:
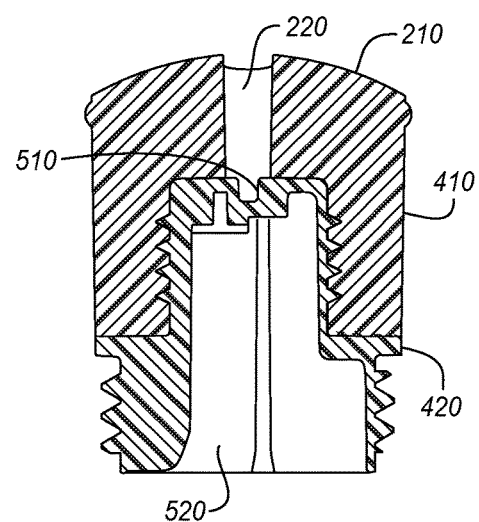
FIG. 5 shows a cross-section of the plug portion of the light-up object of FIG. 1.
Figure 6:
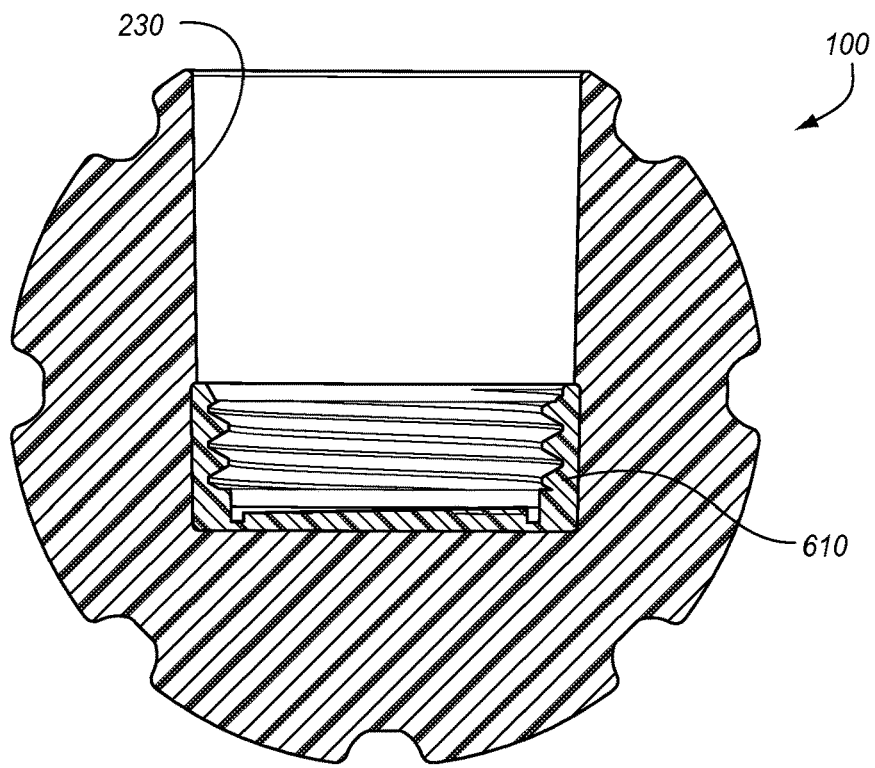
FIG. 6 shows a cross-section of the body portion of the light-up object of FIG. 1.
Figure 7:
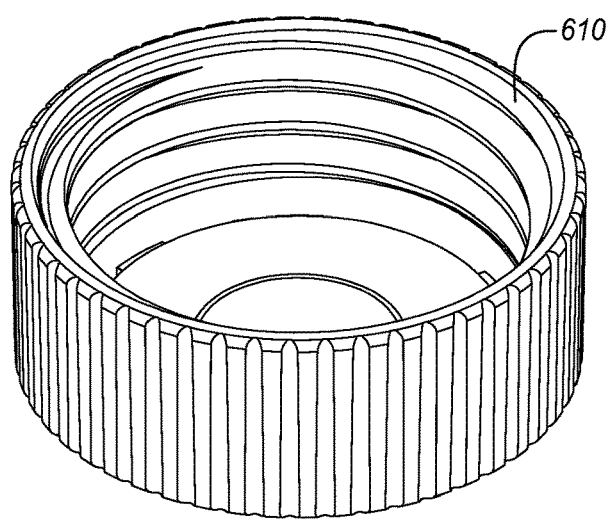
FIG. 7 shows an embodiment of the cap portion of the light-up object of FIG. 1.

FIG. 5 shows a cutaway view of plug 210. As shown, the TPR section 410 is interconnected with the polycarbonate section 420 (also called a first inner capsule). This is typically done to provide a permanent attachment. The polycarbonate section 420 includes a screw driver notch 510, such that a screw driver may be inserted into indentation 220 and notch 510 to provide for torque to turn the plug 210 and attach and detach it from the reciprocal screw section. Lighting module 430 is inserted into cavity 520. As can be known from the figures, the polycarbonate section 430 mates with the reciprocal screw section which may be approximately in the form of a cap. Cap 610 (also called a second inner capsule) is shown in FIGS. 6 and 7. This provides an airtight bottle that will keep water or other materials from affecting lighting module 430. FIGS. 6 and 7 show how an exemplary cap 610 is located in the cavity 230.

Control board 460 controls the activation of lighting source 450. This occurs typically according to detecting an acceleration event. In one embodiment, control board 460 includes an accelerometer. In many embodiments, control board 460 includes two accelerometers. Control board 460 and the accelerometers may cooperate to activate and deactivate the lighting source. In one embodiment, when ball 100 experiences sufficient acceleration, control board 460 may activate lighting source 450. Typically, the acceleration level is set to be somewhat significant, such that simply moving the ball will not cause it to activate. In one embodiment, the control board is set to activate ball 100 when an impulse would be experienced by dropping ball 100 against a hard surface from a height of anywhere from 3 inches to 2 feet or greater. As one of ordinary skill will appreciate, the system may be set to provide activation under various acceleration scenarios.

In some embodiments, control board 460 activates the lighting source if the ball is dropped from a height of 1 meter or greater. This eliminates the need for an external switch that may be damaged if the ball is bitten by an animal. The impulse experienced is similar to a user firmly slamming the ball into one's palm; therefore, the device may be activated without bouncing. After activation, the lighting source will stay in a first active condition for a period of five minutes. This time period is purely exemplary, of course. During the first active condition, if the user again applies the requisite impulse to the ball, then the five-minute time period will reset (time period of the first active condition). If no impulse significant enough to activate the system is experienced in the five-minute period, then control board 460 will transition to a second active condition. In this condition, the lighting source will blink quickly for a period of five minutes before deactivating. Any impulse significant enough as to provide a similar impulse as a drop from a height of a meter or greater will reactivate the first active condition.

If the battery of the ball is low, then a fast blinking may be activated upon receiving a significant impulse, instead of activating the first active condition to provide notice to the user of the need to change batteries.

This is merely one example of an activation scheme, and others will occur to those of ordinary skill in the art. The principles of one scheme provide for activation of a first lighting state upon receiving an impulse of a first level. The first lighting state continues for a first period of time. If at any time an impulse of a first level is measured, the first period of time resets. If no impulse is received in the first period of time, then a second lighting state is activated. This state continues for a second period of time until the end of the second time period is reached. At this point, the device shuts off. This is purely an exemplary method of operation, and in some embodiments, no second lighting state may be activated; instead the system may merely shut off at the end of the first time period.

In addition to the features described herein, due to the screw interconnection and protection of the system, the ball may be considered IPX8 water resistant. Additionally the system may float.

In many embodiments, parts of the system, especially the control board, are provided in devices including microprocessors. Various embodiments of the systems and methods described herein may be implemented fully or partially in software and/or firmware. This software and/or firmware may take the form of instructions contained in or on a non-transitory computer-readable storage medium. Those instructions then may be read and executed by one or more processors to enable performance of the operations described herein. The instructions may be in any suitable form such as, but not limited to, source code, compiled code, interpreted code, executable code, static code, dynamic code, and the like. Such a computer-readable medium may include any tangible non-transitory medium for storing information in a form readable by one or more computers such as, but not limited to, read only memory (ROM); random access memory (RAM); magnetic disk storage media; optical storage media; a flash memory, etc.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

What is claimed as new and desired to be protected by Letters Patent of the United States is:

1. A light-up object comprising:
   a rubberized outer body, the outer body including a pair of first depressions on opposing first and second sides of the outer body, a plurality of second depressions on only the first side of the outer body and radially adjacent one of the pair of first depressions, a plurality of third depressions on only the second side of the outer body and radially adjacent the other of the pair of first depressions, and a plurality of grooves defined within an outer surface of the outer body, the plurality of grooves extending between the pair of first depressions, each of the plurality of grooves in open communication with the pair of first depressions, at least one of the plurality of second depressions, and at least one of the plurality of third depressions;
   a plug in a cavity of the outer body; and
   a lighting device located in the plug.
2. The light-up object of claim 1, further comprising:
   a first inner capsule piece, the first inner capsule piece located in the plug; and
   a second inner capsule piece located in the cavity of the outer body, the second inner capsule piece shaped to engage with the first inner capsule piece.

3. The light-up object of claim 2, wherein the first and second inner capsules are threaded to fit together.

4. The light-up object of claim 3, wherein the first inner capsule is fixed in the plug.

5. The light-up object of claim 4, wherein the plug is overmolded on the first inner capsule.

6. The light-up object of claim 5, wherein the second inner capsule is fixed in the cavity.

7. The light-up object of claim 1, wherein the plurality of grooves run around multiple circumferences of the outer body.

8. The light-up object of claim 7, wherein the outer body has a circumference between 9 inches and 9.25 inches; the outer body is shaped approximately like a sphere; and the plurality of grooves are at least 5 mm deep in the outer body.

9. The light-up object of claim 8, wherein the plurality of grooves are at least 1 cm deep and the plurality of grooves are located around the circumference of the outer body.

10. The light-up object of claim 6, wherein the plug includes an indentation and the first inner capsule includes a notch, the notch aligned with the indentation, such that a screwdriver head may be placed through the indentation and into the notch to apply torque to the plug and first inner capsule.

11. The light-up object of claim 10, wherein the plug and the outer body are composed of translucent Thermo Plasticized Rubber (TPR).

12. The light-up object of claim 11, wherein the first and second inner capsules are composed of polycarbonate.

13. The light-up object of claim 1, wherein the lighting device includes an LED.

14. The light-up object of claim 13, wherein the lighting device includes a control board connected to the LED, the control board including and executing code to cause the LED to be activated in a first operational mode for a first time period when a first impulse or greater is measured by the control board.

15. The light-up object of claim 14, wherein the control board includes a first accelerometer and a second accelerometer for measuring the first impulse.

16. The light-up object of claim 14, wherein after the first period of time the LED is activated in a second operational mode for a second period of time.

17. The light-up object of claim 16, wherein after the second period of time, the LED is deactivated.

18. The light-up object of claim 17, wherein if at any time, the first impulse or greater is measured by the control board, the first time period is reset and the LED is activated in the first operational mode.

19. The light-up object of claim 1, wherein the pair of first depressions define major depressions, and wherein the plurality of second depressions and the plurality of third depressions define minor depressions.

20. A light-up object comprising:
a rubberized outer body;
a plug in a cavity of the outer body;
a lighting device located in the plug;
a first inner capsule piece fixed in the plug, the plug overmolded on the first inner capsule piece; and
a second inner capsule piece fixed in the cavity of the outer body, the first and second inner capsule pieces threaded to fit together;
wherein the plug includes an indentation and the first inner capsule piece includes a notch, the notch aligned with the indentation such that a screwdriver head may be placed through the indentation and into the notch to apply torque to the plug and first inner capsule piece.

* * * * *